Oct. 14, 1958 P. N. NELSON 2,856,043
ACCELERATOR CONTROL MECHANISM
Filed Nov. 7, 1956
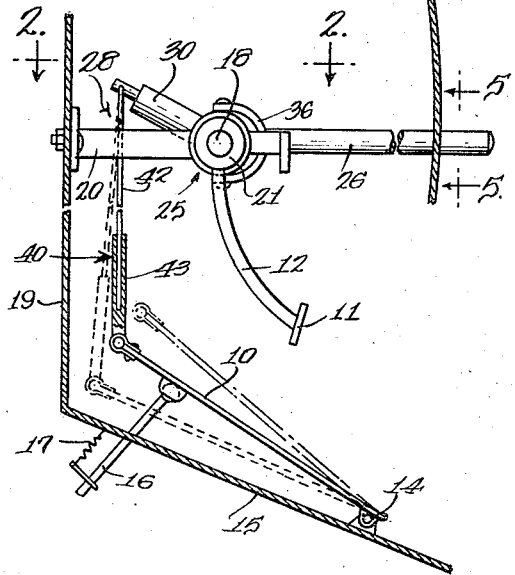
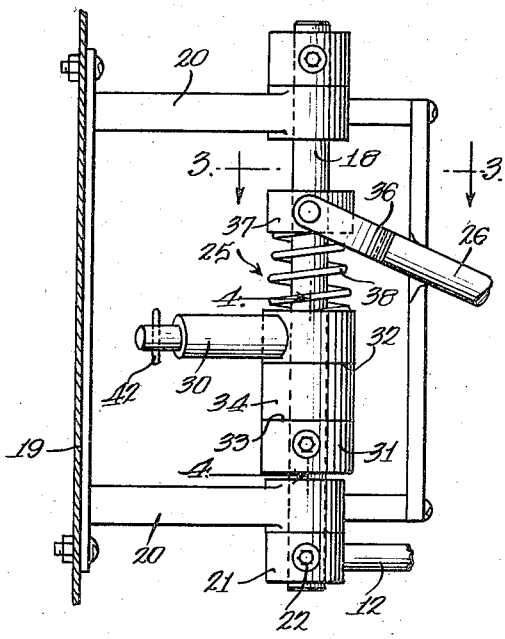
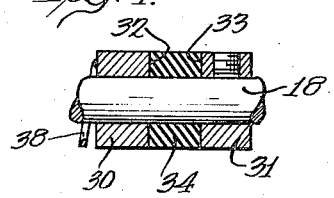
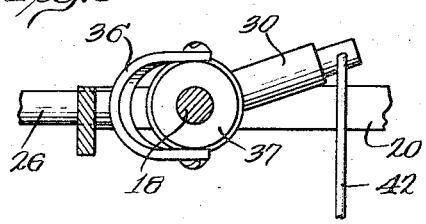
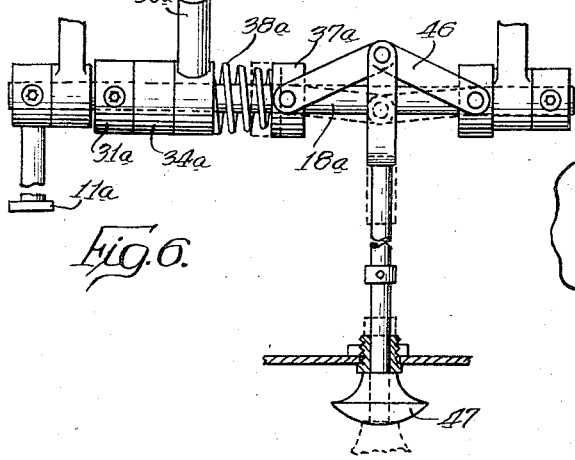
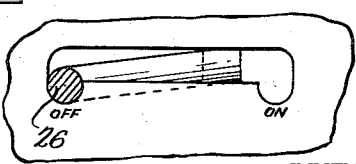
INVENTOR.
Permil N. Nelson
BY
Carlson, Pitzner, Hubbard & Wolfe
Attys.

United States Patent Office 2,856,043
Patented Oct. 14, 1958

2,856,043

ACCELERATOR CONTROL MECHANISM

Permil N. Nelson, Galesburg, Ill., assignor to Lynn H. Ewing, doing business as Black Hawk Company, Rock Island, Ill.

Application November 7, 1956, Serial No. 620,823

4 Claims. (Cl. 192—3)

The present invention relates to an improved control linkage for the foot-operated throttle, known as the accelerator, of a motor vehicle fuel control system. More particularly, the present invention relates to an improved, hand-operated control linkage for use with such an accelerator.

It is the principal object of the present invention to provide an improved linkage mechanism for positioning or retaining in a predetermined position the accelerator of a motor vehicle in order to relieve the strain and reduce the fatigue of the motor vehicle operator and to conserve the motor vehicle fuel when traveling at sustained speeds by maintaining a constant fuel supply to the motor vehicle engine.

Another object of the present invention is to provide an improved accelerator control mechanism of the foregoing type which is adapted to be operated by hand and which can hold the accelerator in an infinite number of positions between the limits of the fully raised and the fully depressed positions thereof.

A further object of the present invention is to provide an improved hand-operated accelerator control mechanism of the foregoing characteristics which does not interfere with the normal operation of the motor vehicle.

Still a further object of the present invention is to provide an improved hand-operated accelerator control mechanism of the foregoing type which is inactivated when the motor vehicle brakes are applied so as to release the accelerator and thereby reduce the flow of fuel to the motor vehicle's engine.

Other objects and advantages of the present invention will become apparent as the following description proceeds, taken in connection with the accompanying drawing therein:

Figure 1 is a diagrammatic representation of a mechanism illustrative of the present invention and acting between a brake pedal and an accelerator of a motor vehicle.

Fig. 2 is a plan view of the mechanism illustrative of the present invention taken substantially in the plane of line 2—2 of Fig. 1.

Fig. 3 is a fragmentary section view taken substantially in the plane of line 3—3 of Fig. 2.

Fig. 4 is a fragmentary section view taken substantially in the plane of line 4—4 of Fig. 2.

Fig. 5 is an elevation view of an illustrative control panel adapted for use with the present invention and taken substantially in the plane of line 5—5 of Fig. 1.

Fig. 6 is a modified form of the present invention.

While a certain illustrative accelerator control mechanism has been shown in the drawing and will be described below in detail, it should be understood that there is no intention to limit the present invention to the specific form disclosed but, on the contrary, the intention is to cover all modifications, alternative constructions, equivalents and uses falling within the spirit and scope of the invention as expressed in the appended claims.

Turning now to the drawing, there is shown in Fig. 1 a diagrammatic representation of an accelerator 10, a brake pedal 11 and brake pedal arm 12 of a motor vehicle such as an automobile. In accordance with usual automobile construction, the accelerator 10 is pivoted at one end 14 to the floor 15 of the automobile and is provided with a rod 16 extending through the floor 15 and connected to the throttle linkage (not shown) leading to the automobile fuel system. The accelerator linkage normally contains a spring 17 for biasing the accelerator 10 to the position in which no fuel flows to the automobile engine, namely the uppermost or raised position, as shown in phantom in Fig. 1.

The brake pedal arm 12 is fixed to a shaft 18 pivotally mounted on the fire wall 19 adjacent the front floor 15 of the automobile. The brake arm 12 on the shaft 18 is also connected to the brake operating linkage (not shown) of the automobile so that when the brake pedal 11 is depressed (in a clockwise direction, as shown in Fig. 1) the brakes of the automobile are applied to slow down and stop the vehicle. As one illustrative form of the mounting for the brake pedal shaft 18, there is shown in Fig. 2 a bracket fixed to the fire wall 19 and comprising a pair of outwardly extending arms 20 having the shaft 18 journaled in the outer ends thereof. To fix the brake pedal arm 12 to the shaft 18, the former is desirably provided with an annular member 21 at its end fixed by means of a set screw 22 to one end of the shaft 18 extending outwardly from one of the brackets 20.

In accordance with the present invention, provision is made for holding the accelerator in a predetermined, depressed position such as that position shown in Fig. 1. This is accomplished by the provision of a linkage mechanism, generally indicated at 25, for releasably holding the accelerator 10 in a depressed position in response to movement of a hand lever 26 from an "off" position to an "on" position (Fig. 5). The linkage mechanism 25 comprises generally a rod or link 28 pivoted at one end to the accelerator 10 and at its other end to a lever arm 30 freely swingably mounted on the brake pedal shaft 18. Thus, as the accelerator, which is pivoted or hinged to the vehicle, is moved downwardly by the action of the operator's foot, the lever arm 30 is moved downwardly by the action of gravity and the link 28. Conversely, as the accelerator is moved upwardly by the spring 17 when the operator releases his foot pressure, the link 28 moves the lever arm 30 a corresponding distance, rocking it about the brake pedal shaft 18.

In order to hold the accelerator in a depressed position, such as that position shown in full lines in Fig. 1, the lever arm 30 is desirably clutched with respect to the brake pedal shaft 18 so as to prevent it from swinging relative thereto. The spring tension on the brake linkage is, of course, sufficiently greater than that of the accelerator linkage spring and the brake pedal shaft is thus not rotated by the accelerator 10 when the lever arm 30 is clutched. Accordingly, by clutching the lever arm 30 to the brake pedal shaft 18, the accelerator is held in a depressed position against the force of the accelerator linkage spring 17 and the operator can then remove his foot from the accelerator since his foot pressure is no longer needed to hold the accelerator in its desired position. This permits greater freedom of movement by the operator during sustained periods of constant speed operation and thereby prevents fatigue and strain, thus keeping the operator more rested and alert to possible danger.

One illustrative form of clutch mechanism is shown in Fig. 2 and comprises a collar 31 fixed to the brake pedal shaft 18 and spaced from the lever arm 30. Both the lever arm 30 and the fixed collar 31 are provided with clutch faces 32 and 33, respectively adapted to engage a sleeve-like friction clutch member 34. The friction clutch sleeve 34 is desirably formed of hard rubber or other material having a high coefficient of friction with metal. The sleeve can be rotatably mounted on the shaft 18 or, if desired, can be fixed to the shaft 18, the fixed collar 31, or the lever arm 30.

To clutch or hold the lever arm 30 with respect to the shaft 18, it is forced tightly against the friction sleeve 34 and the fixed collar 31 on the shaft 18. The friction force between the clutch members, that is the lever arm 30, the friction sleeve 34, and the fixed collar 31, is sufficient to overcome the force of the accelerator linkage spring 17 and thus the accelerator 10 is held in the depressed position which it occupied when the lever arm clutch was engaged.

Suitable force applying means are provided on the brake pedal shaft for engaging the friction clutch of the lever arm on the shaft. One such means desirably comprises a shifter fork 36 on the end of the hand lever 26 swingably engaging a collar 37 slidably mounted on the shaft 18. A coil spring 38 is mounted on the collar 37 and extends concentric with the shaft 18 into sliding engagement with the lever arm 30. As the hand lever is moved to the "on" position, the shifter fork slides the collar 37 towards the lever arm 30 thereby compressing the spring 38. The spring, when compressed, exerts a clutching force on the lever arm 30 and forces the clutch faces 32 and 33 into engagement with the friction clutch sleeve 34. Similarly, movement of the hand lever 26 from the "on" to the "off" position releases the force exerted by the coil spring 38 on the lever arm 30 and thereby allows the lever arm 30 to swing free relative to the brake pedal shaft 18. Upon release of the hand lever, the accelerator linkage spring 17 urges the accelerator 10 upwardly whereupon the fuel supply to the automobile engine is reduced.

As an important desirable feature of the present invention, the lever arm 30 and friction clutch sleeve 34 are purposely mounted on the brake pedal shaft 18. Thus, rotation of the brake pedal shaft as the brake pedal is depressed to apply the vehicle's brakes, serves to swing the lever arm 30, and thus the accelerator 10, upwardly from the depressed position in which the accelerator 10 had been set. In this way, as the brakes of the automobile are applied, the flow of fuel in the vehicle's fuel system is reduced even though the accelerator had been set in a depressed position of increased fuel flow. This release of the accelerator in response to brake operation not only reduces wear and tear on the brakes of the vehicle but provides a substantial safety factor in decreasing the speed of the automobile by the braking effect of the engine. Furthermore, application of the accelerator 10 by means of the hand lever 26 is impossible when the brakes are applied since the lever arm 30 is swung upwardly far enough to preclude its having any effect on the position of the accelerator 10.

As a further advantage of the present invention, it is desirable, when the vehicle accelerator is locked in a position intermediate the high and low speeds of the vehicle, that it be possible to further depress the accelerator for the purposes of increasing the fuel supply to the vehicle engine. For example, when it is desired to pass, climb a hill, or otherwise accelerate the vehicle, it is desirable to have the ability to freely increase the fuel flow to the engine. To this end, a lost motion linkage mechanism 40 is provided. This lost motion connection comprises a part of the link 28 and includes a sleeve 40 receiving one end of a rod 42. The sleeve 40 is connected to the accelerator 10 and the rod 42 is connected to the lever arm 30. The rod 42 engages the bottom 43 of the sleeve portion 40 to determine the upper limit of the accelerator movement. Thus, when the accelerator is in a partially depressed position, as shown in Fig. 1, it is still possible to further depress it to a position, such as is shown in dotted lines, where more fuel is supplied to the vehicle engine. When the need for the extra power and extra fuel has passed, the accelerator is released by the operator and will resume its intermediate depressed position as determined by the hand lock and friction clutch. The vehicle will then resume its constant speed as determined by the accelerator setting.

In summary, the operation of the novel mechanism embodying the present invention may be described briefly as follows. When the vehicle, such as an automobile, which is equipped with the above-described novel accelerator control mechanism, is traveling at a constant speed and the operator wishes to continue at the same speed, a hand lever 26 is shifted from the "off" position to the "on" position. This engages a friction clutch thereby fixing the position of the lever arm. The lever arm being connected directly to the accelerator 10 by means of a link 28, fixes the upper position of the accelerator when the hand lever is set in the "on" position. Should it be necessary for the automobile operator to increase the speed of the automobile to increase its power, such as would be necessary when ascending a hill, for example, the accelerator is free to be further depressed to supply added fuel to the engine by the provision of the lost motion connection 40 in the link 28. If, on the other hand, it becomes necessary to reduce the speed of the automobile, the operator merely applies a force to the brake pedal. This force serves to apply the brakes of the automobile and, at the same time, to rotate the lever arm 30 and thereby allow the accelerator to rise from its depressed position so as to reduce the fuel flow to the automobile engine. The engine thus slows down and adds its braking effect to the brakes for slowing the vehicle. Upon release of the brake pedal, the accelerator then resumes its preselected depressed position, being moved thereto by the lever arm 30 and linkage 28.

If desired, a suitable release can be provided between the brake pedal arm 12 and the hand lever 26 to release the latter when the brake pedal 11 is depressed more than a predetermined amount such as would be the case when the vehicle is brought to a full stop.

A modified form of the accelerator control mechanism embodying the present invention is shown in Fig. 6. Similar reference characters have been used, where applicable, with the distinguishing suffix "a." For some applications the use of a pull-push knob for locking the automobile accelerator in a depressed position is desirable. To this end, an overcenter toggle linkage 46 is provided operative in response to a pull or push on a control knob 47. The toggle linkage 46 is connected to the sliding collar 37a. When the knob 47 is pulled outwardly, the toggle linkage 46 snaps overcenter, forcing the sliding collar 37a to compress the spring 38a which in turn exerts a clutching force on the lever arm 30a. In a manner similar to that described above, the lever arm 30a is clutched to the brake pedal shaft 18a by means of the friction clutch sleeve 34a and the collar 31a fixed on the shaft 18a. When the accelerator 10 has been depressed a predetermined amount and the pull knob 47 is pulled out, the accelerator 10 is held depressed by the lever arm 30a and the linkage 28a substantially as described above. Furthermore, depressing the brake pedal 11a rotates the brake pedal shaft 18a and the lever arm 30a clutched thereto to allow the accelerator 10 to rise from its depressed position. To release the accelerator, the lever arm 30a is declutched by pushing the pull knob 47 inwardly. This snaps the toggle linkage 46 to its original position, thereby releasing the force exerted by the spring 38a on the lever arm 30a and the friction clutch sleeve 34a.

There has thus been described an improved accelerator control mechanism for holding the accelerator of a vehicle in a predetermined depressed position for maintaining a constant vehicle speed. Such a simple, effective and safe, hand-operated mechanism serves to substantially reduce the fatigue and strain on the operator of the vehicle on which it is used when traveling long distance at constant speeds.

I claim as my invention:

1. In combination, a vehicle accelerator hinged to the vehicle, a brake pedal shaft pivotally mounted on the vehicle having a brake pedal fixed thereto, a lever arm rotatably mounted on said shaft, a link pivotally connecting said lever arm to said accelerator so that the lever arm moves in response to movements of the accelerator, said link including a lost motion linkage, and means including a releasable friction clutch for fixing said lever with respect to said pivot shaft for holding said accelerator in a selected, depressed position, said lost motion linkage permitting said accelerator to be depressed independently of said lever arm, said lever arm and friction clutch limiting upward movement of said accelerator whereby said accelerator is normally held in said depressed position, is released therefrom when said brake pedal is depressed, and is returned thereto when said brake pedal is released.

2. In combination, a vehicle accelerator hinged to the vehicle, a brake pedal shaft pivotally mounted in the vehicle having a brake pedal fixed thereto, a lever arm rotatably mounted on said shaft, a link pivotally connecting said lever arm to said accelerator so that the lever arm moves in response to movements of the accelerator, and a releasable friction clutch for fixing said lever with respect to the pivot shaft to hold said accelerator in a selected, depressed position, said lever arm and friction clutch limiting upward movement of said accelerator whereby said accelerator is normally held in said depressed position, is released therefrom when said brake pedal is depressed, and is returned thereto when said brake pedal is released.

3. An accelerator position control mechanism for use on an automotive vehicle having a throttle operatively connected to a foot operated accelerator and a brake system operatively connected to a foot operated brake pedal, the pedal being fixed on a shaft journaled for rotation on the automobile frame, said mechanism comprising, in combination, a lever arm rotatably mounted on the shaft, means for operatively connecting said lever arm to the accelerator, said lever arm being rotatable on said shaft as the accelerator is depressed to a selected position, and releasable means for fixing said lever arm to said shaft to hold the accelerator in said selected depressed position, the accelerator being raised from said selected position in response to the brake pedal energization of the vehicle brake system and returned to said selected position in response to the deenergization of the vehicle brake system.

4. An accelerator position control mechanism for use on an automotive vehicle having a throttle operatively connected to a foot operated accelerator and a brake system operatively connected to a foot operated brake pedal, the pedal being fixed on a shaft journaled for rotation on the automobile frame, said mechanism comprising, in combination, a lever arm rotatably mounted on the shaft, means for operatively connecting said lever arm to the accelerator, said lever arm being rotatable on said shaft as the accelerator is depressed to a selected position, and releasable means for fixing said lever arm to said shaft to hold the accelerator in said selected depressed position, the accelerator being raised from said selected position in response to the brake pedal energization of the vehicle brake system and returned to said selected position in response to the deenergization of the vehicle brake system, said connecting means including a lost motion means so that the accelerator can be depressed further from said selected position independently of said releasable fixing means.

References Cited in the file of this patent

UNITED STATES PATENTS

| | | |
|---|---|---|
| 872,478 | Thum | Dec. 3, 1907 |
| 1,674,121 | Owens | June 19, 1928 |
| 2,258,007 | Gonderman | Oct. 7, 1941 |